(No Model.)

J. McCANDLESS.
Tap for Threading Sockets.

No. 240,917.             Patented May 3, 1881.

Witnesses:
R. H. Whiteley
C. L. Parker

Inventor John McCandless,
By Attorney George H. Christy

N. PETERS, PHOTO-LITHOGRAPHER, WASHINGTON, D.C.

UNITED STATES PATENT OFFICE.

JOHN McCANDLESS, OF ALLEGHENY, ASSIGNOR TO HIMSELF AND SPANG, CHALFANT & CO., OF ALLEGHENY COUNTY, PENNSYLVANIA.

TAP FOR THREADING SOCKETS.

SPECIFICATION forming part of Letters Patent No. 240,917, dated May 3, 1881.

Application filed November 4, 1880. (No model.)

*To all whom it may concern:*

Be it known that I, JOHN MCCANDLESS, of Allegheny, county of Allegheny, State of Pennsylvania, have invented or discovered a new and useful Improvement in Taps for Threading Sockets; and I do hereby declare the following to be a full, clear, concise, and exact description thereof, reference being had to the accompanying drawings, making a part of this specification, in which—like letters indicating like parts—

Figure 1:
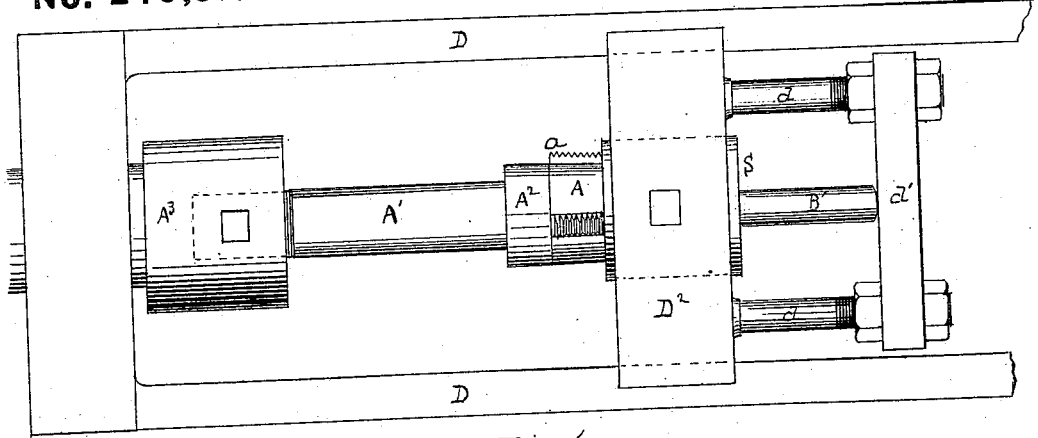
Figure 2:
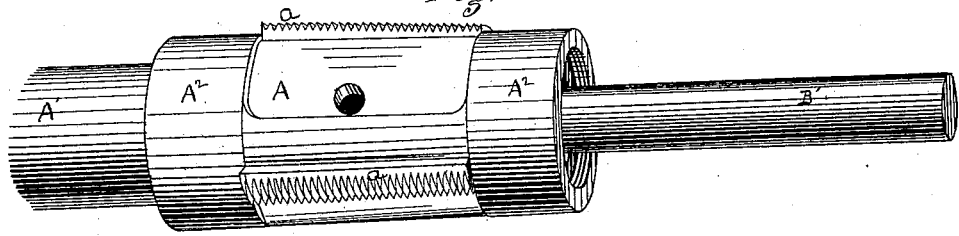
Figure 3:
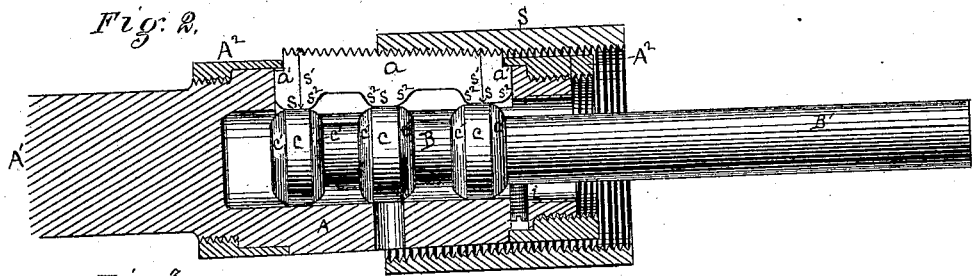
Figure 4:
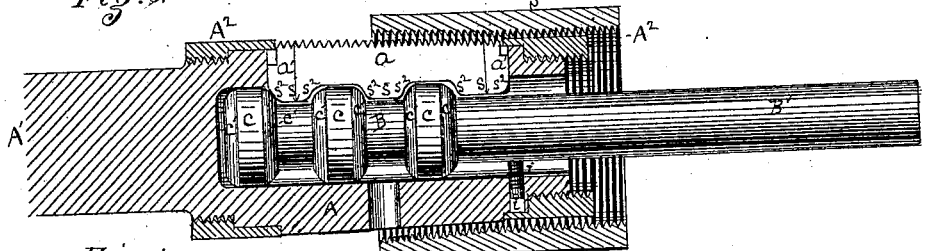
Figure 5:
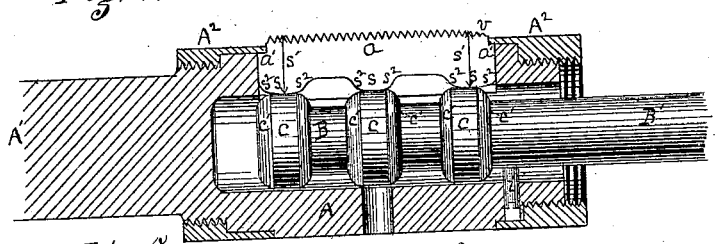

Figure 1 is a top or plan view, in outline, of so much of a socket tapping and tapering machine as is necessary to illustrate my present invention. Fig. 2 is a view, in perspective, of my improved tool. Fig. 3 is a longitudinal sectional view of the same, and showing one of the tap-dies in working position inside a socket. Fig. 4 is a like view, showing the die clear of the socket. Fig. 5, by a like view, shows the same invention as embodied in a tapping-tool.

My invention relates to the construction of a tool and mechanism primarily designed for tapering threaded metallic sockets, such as are employed for coupling together or uniting successive lengths of pipes or tubing. As now practiced in the art, pipe ends are chased or threaded with a slight taper, and the sockets are first tapped to a uniform or nearly uniform diameter, and then by a subsequent operation the opposite threaded or tapped ends are made slightly conical, or with a counter-taper inside, and in such manner that the pipes and sockets may ordinarily be screwed together by hand, up to within about three or four threads of the shoulders of the pipes, after which, by a few turns with a wrench, the screwing and coupling operation is completed, and the parts drawn together so tightly as to give the desired good joint; and by a slight modification in the construction of my improved tool I adapt it for use in the tapping of the socket before tapering, or when no tapering is desired, and such modification I include herein as a part of my present invention; but I will first describe that part of my invention which relates to the tapering of a previously-tapped socket, and refer for that purpose to Figs. 1 to 4.

My improved tool has a stock, A′, by means of which it may be connected with any suitable chuck, such as is employed in turning or lathe operations.

The head A is made hollow, open at its forward end, as shown, and in the shell thus formed I make one, two, three, or more recesses or slits, according to the number of tap-dies to be used therein, (three being the preferable number,) and in each such slit I insert a tap-die, $a$. Preferably each tap-die is made loose at both ends, but with a limited range of motion. When in place they are prevented from coming out by means of a shoulder, $a'$, on the end of each, and the screw-rings $A^2$ $A^2$ are, after the dies are inserted, screwed up till a flange on the end of each ring shall overlap the shoulders. Each die $a$ is made with two or more supporting-lugs, $s$, the number varying with the length of the die, and they should be such in number that both ends of each die will be properly supported, and any material amount of springing between the ends will be prevented. The breadth of each die, measured on the lines $s'$, Fig. 3—that is, from the cutting-edge to the edge faces of the end lugs— should be such that when the die is supported, as presently to be described, its cutting-edge will stand at the proper angle for giving the desired taper to the socket. Each of the end supporting-lugs, and preferably all of them, are made with a bevel or incline, $s^2$, on both ends of its face, and each such bevel or incline is made quite steep.

Inside the head A is a mandrel, B, having thereon a series of two or more rings or projections, $c$, corresponding in number and relative arrangement to the lugs $s$ on the tap-dies $a$. The faces of these rings operate as die-seats to hold the tap-dies out to their work. Each ring has a bevel or incline, $c'$, on both ends corresponding, at least approximately, to the bevels or inclines $s^2$ of the lugs $s$, and the depths of the depressions between the seats $c$ are at least equal to the inward motion which the tap-dies should receive in clearing the socket as soon as the work of tapering is done. The mandrel B has a stem, B′, which projects far enough or is long enough to engage or be engaged by any suitable stop or gage, such as may give to the mandrel an endwise motion, or, if such stem be omitted, the stop or gage device may carry a stem which at the proper time shall engage and shift the mandrel, or, the stem being used, the mandrel may be shifted backward or inward by the endwise blow of a hammer given at the proper time.

In order that the operation of this tool and mechanism may be more readily understood I have in Fig. 1 illustrated in outline, top, or plan view, so much of a machine as is necessary for the purpose; but in so far as relates to the construction of a machine in which to use the tool described I make no claim herein, but reserve that for a separate patent.

D represents the bed plate or frame of the machine, and $A^3$ the chuck in which the headstock $A'$ is secured.

On any suitable guides or ways a sliding socket-holder, $D^2$, may be arranged so as to be moved up to or away from the tapping-die head A. Two connecting-rods, $d\ d$, may lead back from this socket-holder, and adjustable thereon is a stop or gage bar, $d'$, adjustability being secured by jam-nuts, as shown, or otherwise.

A threaded socket, S, is inserted in the socket-holder and properly secured, and run up to the threading-dies; but before doing so the mandrel B is thrust to the right (if not already there) and to the position shown in Fig. 3, so that the contiguous or engaging inclines $s^2$ and $c'$, sliding on each other, shall result in the tap-dies being forced radially outward and in proper position for doing their work, the base of each lug $s$ resting on the surface of a projection, $c$. The cutting-threads of the tap-dies $a$ then engaging the threads of the socket on the rotation of the head A, draw the socket forward and enlarge or taper the inside of the end presented and perfect the threading or tapping, as illustrated in Fig. 3. As soon as this is completed the stop or gage bar $d'$ engages the end of the stem $B'$ and shifts the mandrel B to the left and to the position shown in Fig. 4, so that the tap-dies $a$, being no longer supported, shall drop away from or clear of their work. The socket-holder may then be slid back, the socket replaced or reversed, and the operation repeated.

If found necessary, suitable devices may be added for giving to the tap-dies an inward as well as an outward positive motion; but for most purposes it is believed that such addition will be unnecessary, since the work of tapering is done under heavy strain, and as soon as the mandrel releases the dies the slackening resulting therefrom will be, in most cases, sufficient to enable the lubricated screw threads and cutters to clear each other on the withdrawal of the socket-holder.

Devices may also be added to give the mandrel a throw to the right, if desired; but this may quite as well be done by hand by the workman whose business it is to tend the machine.

To prevent the mandrel from being pulled out of the head A a stop-screw, $i$, may be put in, so that it shall be engaged by one of the rings $c$, when the mandrel is moved to the right. I prefer to make the rings or seats $c$ with cylindrical seating-faces; but, if so preferred, the mandrel may be so inserted in the head that it cannot rotate on its axis, and in such case the seats $c$, each ending in a proper steep incline, may be provided for each lug $s$.

While the degree of obliquity or the angle at which to make the inclines $s^2$ and $c'$ may be varied somewhat in a tool having a mandrel capable of a free endwise motion, as described, without any substantial departure from the present invention, and while this is especially true of those inclines which come into operation when inserting the mandrel into the head and between the dies, it is still true that such inclines should be comparatively steep, particularly in those inclines which come into use in the ordinary operation of the tool, because the mandrel must be so completely shifted as to enable the tap-dies to "let go" or clear the socket-threads by the engagement of the dies and threads themselves, and such clearance should take place only after the work is done, and ought also to take place as soon as possible after the work is done. Hence a long incline of small pitch would cause the tap-dies to let go slowly, and the cutting action of the dies would be liable to be incomplete and imperfect, or else to be carried beyond the desired point or stage of completion. In either case the results would be correspondingly imperfect; but by making the inclines steep I am enabled by a short motion of the mandrel, imparted to it just at the completion of the proper work of the dies, to cause the dies to let go and clear themselves automatically and, in a practical sense, instantaneously.

It will also be within my invention to make the tap-dies of uniform width, or, in fact, tapering in width the other way, and secure their proper inclination for work by making the seats $c$ of the proper varying heights.

The modification of my invention above referred to (illustrated in Fig. 5) relates to the adaptation of the devices described to the work of tapping the socket as distinguished from tapering it. For such purpose the construction and operation remain the same as above described, except that the tap-dies are made of uniform width at both ends, (measured on the lines $s'$, Fig. 5, as before,) and their forward ends, which enter the socket, are slightly beveled or tapered, as illustrated at $v$, as is common in such dies, to enable them to effect an engagement with the socket. In other respects like modifications may be made as are already referred to; and, furthermore, in either case the head A may be made stationary and a rotary motion given to the socket, though less advantageously. It may also be stated that the inclines or bevels on the lugs $s$ and seats $c$, which do not come into use in the operation above described, are of use in inserting and removing the mandrel; but if not desired for such use they may be omitted.

I claim herein as my invention—

1. The mandrel B, capable of a free endwise motion under the blow of a hammer, or otherwise, and having die-seats $c$ thereon steeply beveled on the sides toward the projecting stem or releasing device, in combination with threading-dies $a$, each having two or more lugs, $s$, made with steep counter-bevels, substantially as and for the purposes set forth.

2. The mandrel B, capable of a free endwise motion, and die-seats $c$ thereon, beveled on both sides, in combination with threading-dies $a$, each having two or more lugs, $s$, also beveled at both ends, substantially as and for the purposes set forth.

In testimony whereof I have hereunto set my hand.

JOHN McCANDLESS.

Witnesses:
R. H. WHITTLESEY,
GEORGE H. CHRISTY.